(12) United States Patent
Ollila et al.

(10) Patent No.: US 10,564,429 B2
(45) Date of Patent: Feb. 18, 2020

(54) GAZE-TRACKING SYSTEM USING ILLUMINATORS EMITTING DIFFERENT WAVELENGTHS

(71) Applicant: Varjo Technologies Oy, Helsinki (FI)

(72) Inventors: Mikko Ollila, Tampere (FI); Klaus Melakari, Oulu (FI); Oiva Arvo Oskari Sahlsten, Salo (FI)

(73) Assignee: VARJO TECHNOLOGIES OY, Helsinki (FI)

(*) Notice: Subject to any disclaimer, the term of this patent is extended or adjusted under 35 U.S.C. 154(b) by 0 days.

(21) Appl. No.: 15/885,984

(22) Filed: Feb. 1, 2018

(65) Prior Publication Data
US 2019/0235248 A1 Aug. 1, 2019

(51) Int. Cl.
*G02B 27/01* (2006.01)
*G02B 27/02* (2006.01)
*G06F 3/01* (2006.01)

(52) U.S. Cl.
CPC ....... *G02B 27/0172* (2013.01); *G02B 27/024* (2013.01); *G06F 3/013* (2013.01); *G02B 2027/0116* (2013.01)

(58) Field of Classification Search
CPC ....... A61B 3/11; A61B 3/113; G02B 27/0176; G02B 6/29356; G02B 13/002;
(Continued)

(56) References Cited

U.S. PATENT DOCUMENTS

2004/0170304 A1* 9/2004 Haven ............... A61B 3/113
382/115
2005/0018313 A1* 1/2005 Kuba ................ G02B 13/002
359/676
(Continued)

FOREIGN PATENT DOCUMENTS

WO 2005046465 A1 5/2005
WO 2007043954 A1 4/2007
(Continued)

OTHER PUBLICATIONS

International Search Report and Written Opinion of the International Searching Authority, Application No. PCT/FI2019/050057, dated Apr. 30, 2019, 19 pages.

*Primary Examiner* — Richard J Hong
(74) *Attorney, Agent, or Firm* — Ziegler IP Law Group, LLC

(57) ABSTRACT

A gaze-tracking system for use in a head-mounted display apparatus, and a method of tracking a user's gaze, via such a gaze-tracking system. The gaze-tracking system includes a plurality of illuminators for emitting light pulses to illuminate a user's eye when the head-mounted display apparatus is worn by the user, the illuminators including at least a first illuminator and a second illuminator; at least one lens positioned on an optical path of reflections of the light pulses from the user's eye, the at least one lens having no chromatic-aberration correction; at least one camera for capturing an image of the reflections of the light pulses; and a processor coupled with illuminators and the at least one camera, the processor being configured to control operations of the illuminators and the at least one camera, and to process the captured image to detect a gaze direction of the user.

17 Claims, 5 Drawing Sheets

(58) Field of Classification Search
CPC .............. G02B 27/0172; G02B 27/024; G02B 2027/0116; G03B 11/00; H04N 9/3129; G01J 3/02; G01S 17/88
See application file for complete search history.

(56) References Cited

U.S. PATENT DOCUMENTS

| | | | | |
|---|---|---|---|---|
| 2005/0175218 A1* | 8/2005 | Vertegaal | ............... | A61B 3/113 382/103 |
| 2007/0014552 A1* | 1/2007 | Ebisawa | ............... | A61B 3/113 396/51 |
| 2007/0031002 A1 | 2/2007 | Venkatesh et al. | | |
| 2007/0153288 A1* | 7/2007 | Wang | ............... | G01J 3/02 356/454 |
| 2008/0284980 A1* | 11/2008 | Skogo | ............... | A61B 3/113 351/210 |
| 2009/0219386 A1* | 9/2009 | Ebisawa | ............... | A61B 3/11 348/78 |
| 2013/0077958 A1* | 3/2013 | Xu | ............... | G03B 11/00 396/544 |
| 2014/0327612 A1* | 11/2014 | Futterer | ............... | G06F 3/013 345/156 |
| 2015/0199006 A1* | 7/2015 | He | ............... | G06F 3/013 345/158 |
| 2016/0131912 A1* | 5/2016 | Border | ............... | G02B 27/0176 345/8 |
| 2017/0059777 A1* | 3/2017 | Han | ............... | G02B 6/29356 |
| 2017/0116476 A1* | 4/2017 | Publicover | ............... | G06K 9/00604 |
| 2017/0205876 A1* | 7/2017 | Vidal | ............... | G01S 17/88 |
| 2018/0149874 A1* | 5/2018 | Aleem | ............... | H04N 9/3129 |

FOREIGN PATENT DOCUMENTS

| | | |
|---|---|---|
| WO | 2013079727 A1 | 6/2013 |
| WO | 2015070182 A2 | 5/2015 |

* cited by examiner

GAZE-TRACKING SYSTEM USING ILLUMINATORS EMITTING DIFFERENT WAVELENGTHS

TECHNICAL FIELD

The present disclosure relates generally to display apparatuses; and more specifically, to gaze-tracking systems for use in head-mounted display apparatuses, such gaze-tracking systems comprising illuminators, lenses, cameras, and processors. Furthermore, the present disclosure also relates to methods of tracking a user's gaze via the aforementioned gaze-tracking systems.

BACKGROUND

Nowadays, head-mounted display apparatuses (or head-mounted devices) are increasingly being used for a number of purposes such as gaming, education, military training, medicine, and so forth. In such an instance, a simulated environment is presented to a user when he/she wears such a head-mounted display apparatus. The head-mounted display apparatus employs contemporary techniques such as stereoscopy to provide the user with a feeling of complete involvement (namely, immersion) within the simulated environment. Therefore, the simulated environment provides the user with an enhanced perception of reality around him/her. Furthermore, the simulated environment could be a fully virtual environment (namely, virtual reality) as well as a real world environment including virtual objects overlaid thereon (namely, augmented reality).

Lately, gaze-tracking (namely, eye tracking) techniques are being employed to determine a direction of gaze of the user, whilst the user uses the head-mounted display apparatus. Generally, in such gaze-tracking techniques, an illumination source is employed for emitting light towards the user's eyes, and an imaging device (for example, such as a camera) is employed for capturing an image depicting pupils of the user's eyes and reflection(s) of the emitted light from the user's eyes. Consequently, the captured image is employed to determine the gaze direction of the user.

However, there exist limitations associated with implementation of such gaze-tracking techniques. In other words, there exist several optical design constraints associated with equipment for implementing such gaze-tracking techniques. Firstly, the imaging device is required to be arranged outside, or at a peripheral region of the head-mounted display apparatus's field of view. However, for proper imaging, the imaging device needs to be arranged close to the user's eyes, for example, such as a few centimetres away from the user's eyes. In such an instance, the imaging device is required to be arranged within the head-mounted display apparatus, or in frame(s) of the head-mounted display apparatus. Secondly, a position of the head-mounted display apparatus with respect to the user's eyes is not constant, since the head-mounted display apparatus may move (or get displaced) during use. Therefore, both the equipment for implementing the gaze-tracking techniques, and equipment (for example, such as displays, projectors, and so forth) for rendering images of the simulated environment require precise calibration. Thirdly, if the user wears spectacles whilst using the head-mounted display apparatus, the reflection(s) of the emitted light from the user's eyes gets reflected from lenses of the spectacles. Such reflections need to be recognized and filtered out for determining the gaze direction of the user.

Therefore, in light of the foregoing discussion, there exists a need to overcome the aforementioned drawbacks associated with conventional equipment and techniques for gaze-tracking.

SUMMARY

The present disclosure seeks to provide a gaze-tracking system for use in a head-mounted display apparatus.

The present disclosure also seeks to provide a method of tracking a user's gaze, via a gaze-tracking system of a head-mounted display apparatus.

The present disclosure seeks to provide a solution to the existing problem of optical design constraints associated with equipment for implementing gaze-tracking. An aim of the present disclosure is to provide a solution that overcomes at least partially the problems encountered in the prior art, and to provide a robust and efficient gaze-tracking system that accurately determines a gaze direction of a user of the head-mounted display apparatus, whilst not being limited to a particular optical design or arrangement.

In one aspect, an embodiment of the present disclosure provides a gaze-tracking system for use in a head-mounted display apparatus, the gaze-tracking system comprising:
  a plurality of illuminators for emitting light pulses to illuminate a user's eye when the head-mounted display apparatus is worn by the user, the plurality of illuminators comprising at least a first illuminator and a second illuminator, a first wavelength of light emitted by the first illuminator being longer than a second wavelength of light emitted by the second illuminator;
  at least one lens positioned on an optical path of reflections of the light pulses from the user's eye, wherein the at least one lens has no chromatic-aberration correction, whereby a first focal plane of the at least one lens corresponding to the first wavelength is farther away from the at least one lens than a second focal plane of the at least one lens corresponding to the second wavelength;
  at least one camera for capturing an image of the reflections of the light pulses, wherein the image is representative of a position of the reflections on an image plane of the at least one camera; and
  a processor coupled in communication with the plurality of illuminators and the at least one camera, wherein the processor is configured to control operations of the plurality of illuminators and the at least one camera, and to process the captured image to detect a gaze direction of the user.

In another aspect, an embodiment of the present disclosure provides a method of tracking a user's gaze, via a gaze-tracking system of a head-mounted display apparatus, the gaze-tracking system comprising a plurality of illuminators comprising at least a first illuminator and a second illuminator, at least one lens and at least one camera, the method comprising:
  emitting light pulses of a first wavelength and a second wavelength, via the first illuminator and the second illuminator respectively, to illuminate a user's eye when the head-mounted display apparatus is worn by the user, the first wavelength being longer than the second wavelength, the at least one lens being positioned on an optical path of reflections of the light pulses from the user's eye, wherein the at least one lens has no chromatic-aberration correction, whereby a first focal plane of the at least one lens corresponding to the first wavelength is farther away from the at least one lens than a second focal plane of the at least one lens corresponding to the second wavelength;

capturing an image of the reflections of the light pulses, via the at least one camera, the image being representative of a position of the reflections on an image plane of the at least one camera; and processing the captured image to detect a gaze direction of the user.

Embodiments of the present disclosure substantially eliminate or at least partially address the aforementioned problems in the prior art, and enables simple, accurate and efficient tracking of the user's gaze direction.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
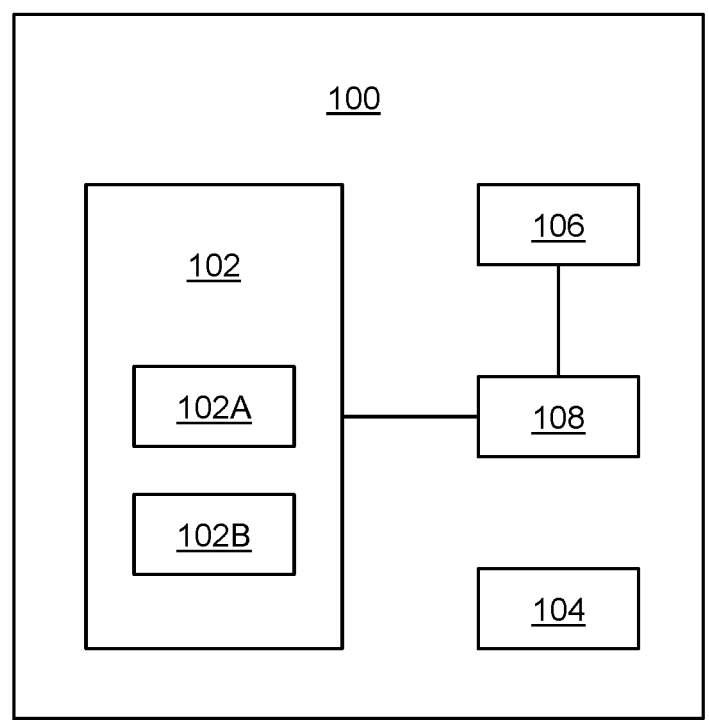
FIG. 1 illustrates a block diagram of a gaze-tracking system for use in a head-mounted display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a gaze-tracking system for use in a head-mounted display apparatus, the gaze-tracking system comprising:

a plurality of illuminators for emitting light pulses to illuminate a user's eye when the head-mounted display apparatus is worn by the user, the plurality of illuminators comprising at least a first illuminator and a second illuminator, a first wavelength of light emitted by the first illuminator being longer than a second wavelength of light emitted by the second illuminator;

at least one lens positioned on an optical path of reflections of the light pulses from the user's eye, wherein the at least one lens has no chromatic-aberration correction, whereby a first focal plane of the at least one lens corresponding to the first wavelength is farther away from the at least one lens than a second focal plane of the at least one lens corresponding to the second wavelength;

at least one camera for capturing an image of the reflections of the light pulses, wherein the image is representative of a position of the reflections on an image plane of the at least one camera; and a processor coupled in communication with the plurality of illuminators and the at least one camera, wherein the processor is configured to control operations of the plurality of illuminators and the at least one camera, and to process the captured image to detect a gaze direction of the user.

In another aspect, an embodiment of the present disclosure provides a method of tracking a user's gaze, via a gaze-tracking system of a head-mounted display apparatus, the gaze-tracking system comprising a plurality of illuminators comprising at least a first illuminator and a second illuminator, at least one lens and at least one camera, the method comprising:

emitting light pulses of a first wavelength and a second wavelength, via the first illuminator and the second illuminator respectively, to illuminate a user's eye when the head-mounted display apparatus is worn by the user, the first wavelength being longer than the second wavelength, the at least one lens being positioned on an optical path of reflections of the light pulses from the user's eye, wherein the at least one lens has no chromatic-aberration correction, whereby a first focal plane of the at least one lens corresponding to the first wavelength is farther away from the at least one lens than a second focal plane of the at least one lens corresponding to the second wavelength;

capturing an image of the reflections of the light pulses, via the at least one camera, the image being representative of a position of the reflections on an image plane of the at least one camera; and processing the captured image to detect a gaze direction of the user.

The present disclosure provides the aforementioned gaze-tracking system and the aforementioned method. The gaze-tracking system is not limited to a particular optical design or arrangement, thereby, allowing for components of the gaze-tracking system to be arranged in any suitable manner. Furthermore, the described gaze-tracking system accurately detects the gaze direction of the user, even upon movement of the head-mounted display apparatus with respect to the user's eye. Moreover, such a gaze-tracking system could be employed for users wearing spectacles, by optically filtering unwanted reflections of the light pulses from the spectacles. Beneficially, the gaze-tracking system is robust and reliable, while the described method allows for high accurate determination of the gaze direction of the user.

Throughout the present disclosure, the term "head-mounted display apparatus" relates to specialized equipment that is configured to present a simulated environment to a user when the head-mounted display apparatus is worn by the user on his/her head. In such an instance, the head-mounted display apparatus is operable to act as a device (for example, such as a virtual reality headset, an augmented reality headset, a pair of virtual reality glasses, a pair of augmented reality glasses, and so forth) for presenting a visual scene of the simulated environment to the user.

Throughout the present disclosure, the term "gaze-tracking system" relates to specialized equipment for detecting a direction of gaze (namely, the gaze direction) of the user. The head-mounted display apparatus uses the gaze-tracking system for determining aforesaid gaze direction via non-invasive techniques. Beneficially, an accurate detection of the gaze direction facilitates the head-mounted display apparatus to closely implement gaze contingency thereon. As an example, the gaze-tracking system may be employed to detect the gaze direction of the user's eye for projecting (i) a region of the visual scene whereat the user's gaze is focused, on and around the fovea of the user's eye, and (ii) a remaining region of the visual scene on the retina of the user's eye, of which the fovea is just a small part. Therefore, even upon a change in the gaze direction (namely, due to a movement of the user's eye), active foveation is implemented within the head-mounted display apparatus.

It is to be understood that the gaze-tracking system may also be referred to as an "eye-tracker system", a "means for detecting a gaze direction", a "means for tracking a gaze direction", or a "gaze-tracking unit".

As mentioned previously, the plurality of illuminators emit light pulses to illuminate the user's eye when the head-mounted display apparatus is worn by the user. In such an instance, the plurality of illuminators could emit the light pulses periodically or intermittently. Optionally, the plurality of illuminators emit light continuously. It will be appreciated that the light pulses emitted by the plurality of illuminators are reflected from an outer surface (for example, such as cornea) of the user's eye, thereby constituting corneal reflections (namely, glints) in the user's eye.

Throughout the present disclosure, the term "plurality of illuminators" relates to light sources configured to emit light pulses for illuminating the user's eye. Optionally, the plurality of illuminators are configured to emit light pulses of infrared or near-infrared wavelength. The light pulses of infrared or near-infrared wavelength are invisible to the human eye, thereby, reducing unwanted distraction when such light pulses are incident upon the user's eye. Alternatively, optionally, the plurality of illuminators are configured to emit light pulses of visible wavelength.

Optionally, the plurality of illuminators are implemented by way of at least one of: active light sources, passive light sources. Throughout the present disclosure, the term "active light sources" relates to equipment that directly emits light therefrom whereas the term "passive light sources" relates to equipment that employs light emanating from an active light source, to emit light therefrom. It will be appreciated that the passive light sources could (i) direct the light emitted by the active light source towards the user's eye and/or (ii) absorb the light emitted by the active light source and consequently emit light of a different wavelength towards the user's eye.

Optionally, the passive light sources are at least one of: fluorescent light sources, phosphorescent light sources. In an example, the plurality of illuminators are implemented by way of two infrared light-emitting diodes and one fluorescent light source that absorbs visible light emitted by a Light Emitting Diode (LED)-based display and emits infrared light therefrom.

Furthermore, optionally, the plurality of illuminators are implemented by way of at least one of: infrared light-emitting diodes, infrared lasers, infrared light projectors, infrared light-emitting diode based displays, visible light-emitting diodes, visible light lasers, visible light projectors, infrared light-emitting diode based displays, fluorescent lamps, fluorescent displays, fluorescent projectors, phosphorescent lamps, phosphorescent displays, phosphorescent projectors.

Optionally, the plurality of illuminators, either alone or in combination with at least one optical element, are operable to produce structured light pulses to illuminate the user's eye. Optionally, in this regard, the plurality of illuminators are arranged substantially proximal to the at least one lens. As a result, a focal distance of the at least one lens is substantially equal to a sum of the distance between the plurality of illuminators and the surface of the user's eye and a distance between the at least one lens and the surface of the user's eye. It will be appreciated that such an arrangement of the plurality of illuminators and the at least one lens allows for capturing an acceptably sharp image of reflections of the structured light pulses from the user's eye. Examples of the at least one optical element include, but are not limited to, a freeform mirror, a freeform lens, a freeform prism, a light guide.

In an example implementation, when the plurality of illuminators are implemented by way of the infrared light-emitting diodes or the visible light-emitting diodes, the focal distance of the at least one lens may be substantially equal to the sum of the distance between the plurality of illuminators and the surface of the user's eye and the distance between the at least one lens and the surface of the user's eye.

In another example implementation, when the plurality of illuminators are implemented by way of the infrared lasers or the visible light lasers, the focal distance of the at least one lens may be substantially equal to the distance between the at least one lens and the surface of the user's eye.

Optionally, in operation, the plurality of illuminators directly emit the light pulses onto the user's eye.

Alternatively, optionally, the plurality of illuminators are operable to emit the light pulses in a direction that is at a predefined angle to a view direction of the user's eye, and wherein the gaze-tracking system further comprises at least one first optical element for reflecting the light emitted by the plurality of illuminators towards the user's eye. In such a case, the at least one first optical element is positioned on an optical path of the emitted light pulses, namely between the plurality of illuminators and the user's eye. As an example, the light can be emitted by the plurality of illuminators in a direction that is substantially perpendicular to the view direction of the user's eye. Optionally, the at least one first optical element is implemented by way of at least one of: a semi-transparent mirror, a fully reflective mirror, a semi-transparent reflector, a prism, a polarizer. As an example, the semi-transparent mirror for implementing the at least one first optical element may be a pellicle mirror.

More optionally, the predefined angle may be selected so as to reduce a size of the gaze-tracking system. In an embodiment, the predefined angle ranges from 120 degrees to 240 degrees. In such an instance, the predefined angle may be, for example, such as 120, 130, 140, 150, 160, 170, 180, 190, 200, 210, 220, 230, or 240 degrees with respect to the view direction of the user's eye. In another embodiment, the predefined angle is lesser than 120 degrees (for example, such as 90, 95, 100, 105, 110, or 115 degrees) or greater than 240 degrees (for example, such as 245, 250, 255, 260, 265, or 270 degrees).

Optionally, the head-mounted display apparatus comprises the at least one first optical element.

It will be appreciated that the plurality of illuminators are optionally arranged for illuminating the user's eye so as to facilitate both bright-pupil tracking and dark-pupil tracking. Furthermore, for implementing the bright-pupil tracking, the light pulses emitted by the plurality of illuminators are arranged to be incident upon the user's eye substantially along the view direction of the user's eye. Moreover, for implementing the dark-pupil tracking, the light pulses emitted by the plurality of illuminators are arranged to be incident upon the user's eye substantially away from (namely, offset from) the view direction of the user's eye.

As mentioned previously, the plurality of illuminators comprise at least the first illuminator and the second illuminator, the first wavelength of light emitted by the first illuminator being longer than the second wavelength of light emitted by the second illuminator. As an example, the first illuminator may emit infrared light having a first wavelength of 900 nanometer, whereas the second illuminator may emit infrared light having a second wavelength of 750 nanometer.

Optionally, the plurality of illuminators further comprise a third illuminator, a third wavelength of light emitted by the third illuminator being shorter than the first wavelength, but longer than the second wavelength, wherein the third illuminator is to be used to illuminate the user's eye for enabling detection of a position of a pupil of the user's eye. In such an instance, positions and/or arrangement of reflections of the light emitted by the first and second illuminators constitute a frame of reference (namely, a set of reference points) with respect to which a position of reflection of the light emitted by the third illuminator is evaluated, to determine the position of the pupil of the user's eye. As an example, the third wavelength of light may be 800 nanometers.

As mentioned previously, the at least one lens is positioned on an optical path of reflections of the light pulses from the user's eye. Optionally, the at least one lens is a lens of the at least one camera, wherein the at least one lens is configured to focus the reflections of the light pulses onto the image plane of the at least one camera. Optionally, the at least one lens is non-detachably integrated within (namely, fixed within) the at least one camera. Alternatively, optionally, the at least one lens is detachably attached to the at least one camera.

Furthermore, optionally, the at least one lens is implemented by way of at least one of: a bi-convex lens, a plano-convex lens.

The at least one lens has no chromatic-aberration correction. In other words, a focal plane of the at least one lens is dependent on a wavelength of light incident upon the lens. This may be attributed to the fact that the at least one lens has different refractive indices corresponding to different wavelengths of light incident thereupon, thereby, allowing for the at least one lens to focus the different wavelengths of light, at different distances therefrom. It will be appreciated that since the reflections of the light pulses from the user's eye are incident upon the at least one lens, the focal plane of the at least one lens is dependent on the wavelength of the light pulses emitted by the plurality of illuminators.

Optionally, a material of the at least one lens is selected such that the at least one lens has substantially high chromatic aberration. Optionally, in this regard, the material of the at least one lens has a substantially low Abbe number. More optionally, the material of the at least one lens has an Abbe number ranging from 20 to 50. The Abbe number (or Abbe value) of the material of a given lens is a measure of dispersion associated with a polychromatic light, when such a polychromatic light passes through the given lens. Therefore, it will be appreciated that lower the Abbe number of the given lens material, higher the chromatic aberration associated with the given lens. Optionally, the material of the at least one lens has a substantially high refractive index. More optionally, the material of the at least one lens has a refractive index ranging from 1.5 to 2.0. It will be appreciated that the at least one lens made of such a high refractive index material would easily bend light passing therethrough, thereby, increasing the chromatic aberration associated with the at least one lens. As an example, the material of the at least one lens may be selected as Tribrid material having Abbe number equal to 40, and refractive index equal to 1.6.

The first focal plane of the at least one lens corresponding to the first wavelength is farther away from the at least one lens than the second focal plane of the at least one lens corresponding to the second wavelength. It will be appreciated that distance of a focal plane of the at least one lens corresponding to a wavelength increases with an increase in the wavelength. Therefore, since the first wavelength of light is longer that the second wavelength of light, the first focal plane is farther away from the at least one lens than the second focal plane. Optionally, a third focal plane of the at least one lens corresponding to the third wavelength is father away from the at least one lens than the second focal plane, but nearer to the at least one lens than the first focal plane. Therefore, in such an instance, the third focal plane lies in between the first and the second focal planes.

Optionally, the first illuminator and the second illuminator are to be arranged in a manner that light pulses emitted by the first illuminator are incident upon a first portion of the user's eye that lies within a depth of field of the first focal plane, and light pulses emitted by the second illuminator are incident upon a second portion of the user's eye that lies within a depth of field of the second focal plane, the first portion of the user's eye being farther away from the at least one camera than the second portion of the user's eye. In such an instance, the first wavelength of light emitted by the first illuminator is incident upon the first portion of the user's eye whereas the second wavelength of light emitted by the second illuminator is incident upon the second portion of the user's eye. It is to be understood that depth of field of a given focal plane relates to a region around the given focal plane within which a given wavelength of light corresponding to the given focal plane could be made incident in order to allow for a reflection of the given wavelength of light to appear acceptably sharp when the at least one lens focuses it onto the image plane of the at least one camera. This may be attributed to the fact that a reduction in focus of the at least one lens with increase in distance from the given focal plane, is very gradual. Therefore, when the given wavelength of light is incident within the depth of field of the given focal plane, a reduction in sharpness of the reflection of the given wavelength of light is imperceptible whilst imaging a reflection of the given wavelength.

Therefore, it will be appreciated that the aforesaid arrangement allows for the reflections of the light pulses emitted by the first and second illuminators to appear acceptably sharp when they are focused by the at least one lens, onto the image plane of the at least one camera.

As mentioned previously, the at least one camera captures the image of the reflections of the light pulses, wherein the image is representative of a position of the reflections on the image plane of the at least one camera. In such an instance, the image depicts positions and/or arrangement of reflections of the light emitted by the plurality of illuminators. In other words, the image depicts the positions and/or arrangement of glints in the user's eye. Throughout the present disclosure, the term "image plane of the at least one camera" relates to a region of the camera whereat the reflections of the light pulses are focused by the at least one lens, to create the aforesaid image. Optionally, the image plane of the at least one camera has a flat surface (namely, a surface without protrusions or depressions).

It will be appreciated that owing to no chromatic-aberration correction of the at least one lens, reflections of the first and second wavelengths of light are in focus at the image plane of the at least one camera, even though the first focal plane and the second focal plane associated therewith, are at different distances from the at least one lens. Therefore, use of suitable wavelengths and the aforesaid optical arrangement of the plurality of illuminators, the at least one lens and the at least one camera, beneficially employs chromatic aberration within the gaze-tracking system.

Optionally, when the plurality of illuminators produce the structured light pulses, the reflections of the structured light pulses appear as a plurality of glints in the captured image. Optionally, the plurality of glints are in a form of substantially V-shaped characters.

Optionally, the gaze-tracking system comprises at least one camera per eye of the user. Optionally, accurate gaze-tracking can be done by employing a single camera for both eyes of the user, since both eyes of the user often move synchronously.

Optionally, the at least one camera is arranged substantially along the gaze direction of the user's eye. In other words, the at least one camera is arranged to capture a front perspective view of the reflections of the light pulses from the user's eye. In such an instance, none or minimal perspective correction is required whilst processing the captured image of the reflections of the light pulses. Furthermore, such an arrangement of the at least one camera with respect to the user's eye is hereinafter referred to as the "frontal imaging arrangement".

Alternatively, optionally, the at least one camera is arranged substantially away from the gaze direction of the user's eye. In other words, the at least one camera is arranged to capture a side perspective view of the reflections of the light pulses from the user's eye. In such an instance, significant perspective correction is required whilst processing the captured image of the reflections of the light pulses. Furthermore, such an arrangement of the at least one camera with respect to the user's eye is hereinafter referred to as the "side imaging arrangement".

Optionally, in the side imaging arrangement, the gaze-tracking system further comprises at least one second optical element that is arranged for directing the reflections of the light pulses from the user's eye towards the at least one camera. In such a case, the at least one second optical element is positioned on an optical path of the reflected light pulses, namely between the user's eye and the at least one camera. As an example, the at least one camera may be arranged substantially perpendicular to the view direction of the user's eye. Therefore, the at least one second optical element may direct (namely, guide or reflect) the reflections of the light pulses towards the at least one camera. Optionally, the at least one optical element is implemented by way of at least one of: a semi-transparent mirror, a semi-transparent film, a prism, a beam splitter, a polarizer, an optical waveguide.

Optionally, the head-mounted display apparatus comprises the at least one second optical element.

Optionally, the at least one camera comprises a plurality of photo-sensitive elements and a plurality of optical filters, an optical filter being implemented per photo-sensitive element. In such an instance, the plurality of photo-sensitive elements are configured to detect and process the reflections of light pulses to capture the aforesaid image. It will be appreciated that the plurality of photo-sensitive elements are operable to act as at least one imaging sensor of the at least one camera. Optionally, one photo-sensitive element corresponds to one pixel of the image captured by the at least one camera. Examples of the plurality of photo-sensitive elements include, but are not limited to, photodiodes, photoresistors, phototransistors, and photosensitive field effect transistors. Furthermore, in such an instance, the plurality of optical filters are implemented in a manner that one optical filter is superposed on one photo-sensitive element. Therefore, the plurality of optical filters are operable to filter the reflections of light pulses from the at least one lens, prior to incidence of such reflections onto the plurality of photo-sensitive elements.

According to an embodiment, the plurality of optical filters are implemented by way a plurality of bandpass filters, wherein each bandpass filter is configured to pass only light lying within a specific wavelength range therethrough. Consequently, such filtered light is incident upon the plurality of photo-sensitive elements. In such an instance, the specific wavelength range could be selected to include at least the first and the second wavelength. In an example, the plurality of optical filters may be implemented by way of a plurality of bandpass filters that are configured to pass therethrough, only reflections of the light pulses within a wavelength range of 800 nanometer to 950 nanometer. In another example, the plurality of optical filters may be implemented by way of a plurality of bandpass filters that are configured to pass therethrough, only reflections of the light pulses within a wavelength range of 380 nanometer to 760 nanometer. In such an instance, a rich-coloured image indicative of spectral properties of the reflections of the light pulses, is captured by the at least one camera.

According to another embodiment, the plurality of optical filters are implemented by way of a Fabry-Perot Interferometer. The Fabry-Perot Interferometer is tunable (namely, controllable) to pass light lying within different wavelength ranges therethrough. Consequently, such filtered light is incident upon the plurality of photo-sensitive elements. Therefore, the plurality of photo-sensitive elements are operable to capture different images of the reflections of the light pulses, corresponding to each of the different wavelength ranges. Optionally, the Fabry-Perot Interferometer comprises optical elements, for example, such as highly reflective mirrors or highly reflective films for implementing the aforesaid filtering operation. In such a case, the Fabry-Perot Interferometer may be operable to filter different wavelengths of the reflections of light pulses via different spatial regions thereof.

According to yet another embodiment, the plurality of optical filters are implemented by way of a Plasmonic filter. The Plasmonic filter is implemented by way of a perforated metal layer comprising a hole array thereon, wherein the hole array comprises a plurality of holes. Furthermore, physical properties (for example, such as size of the holes, shape of the holes, arrangement of the holes, separation between the holes, and so forth) of the hole array allow for controlling passage of light through the Plasmonic filter. In other words, the physical properties of the hole array may be adjusted to allow light lying within different wavelength ranges to pass therethrough.

According to still another embodiment, the plurality of optical filters are implemented by way of a plurality of colour filters. Beneficially, the plurality of colour filters are ordinary colour filters, for example, such as Bayer colour filters (or GRGB colour filters), CYGM colour filters, RGBE colour filters, and the like.

In an embodiment, the plurality of photo-sensitive elements and the plurality of optical filters are implemented together within the at least one camera. In another embodiment, the plurality of photo-sensitive elements and the plurality of optical filters are implemented separately within the at least one camera. In yet another embodiment, the plurality of photo-sensitive elements are implemented within the at least one camera whereas the plurality of optical filters are implemented external to the at least one camera.

Furthermore, optionally, the plurality of optical filters are divided into at least a first group and a second group, optical filters of the first group being configured to substantially allow a first range of wavelengths to pass through, while optical filters of the second group being configured to substantially allow a second range of wavelengths to pass through. It will be appreciated that such grouping of the plurality of optical filters allows for light within different ranges of wavelengths to be incident upon different regions of the at least one imaging sensor that is implemented by way of the plurality of photo-sensitive elements.

Optionally, the first wavelength of light (emitted by the first illuminator) lies within the first range of wavelengths and the second wavelength of light (emitted by the first illuminator) within the second range of wavelengths. Optionally, in this regard, reflections of the first and second wavelengths of light are incident upon different regions of the at least one imaging sensor. Therefore, such reflections are clearly distinguishable within the captured image.

Additionally, optionally, the plurality of optical filters are further divided into a third group, optical filters of the third group being configured to substantially allow a third range of wavelengths to pass through. Optionally, the third wavelength of light (emitted by the third illuminator) lies within the third range of wavelengths. In such an instance, the third wavelength of light passes through the optical filters of the third group, to be incident upon photo-sensitive pixels corresponding to the optical filters of the third group. Therefore, reflections of the third wavelength of light that allow for determination of the position of the pupil of the eye, are clearly distinguishable within the captured image.

Optionally, the plurality of optical filters are implemented on a single chip, and the processor is configured to adjust a spatial arrangement of the optical filters of the first group and of the second group into separate regions of the single chip, and to define shapes and/or sizes of the regions based upon an eye geometry and the gaze direction of the user's eye. One such chip has been shown in conjunction with FIGS. 4A and 4B, as elucidated in detail below. It will be appreciated that such an adjustment of the spatial arrangement of the optical filters of the first and second groups allow for focusing the first and the second wavelengths of light onto spatially distinct photo-sensitive elements, thereby, allowing for the reflections of such light pulses to be clearly distinguishable from each other. Furthermore, defining the shapes and/or the sizes of such regions according to the aforesaid criteria allows for the captured image to accurately depict the reflections of the light pulses in the user's eye when the front imaging arrangement is employed as well as when the side imaging arrangement is employed. In other words, by way of such an implementation, the at least one camera could capture the most accurate image depicting the reflections of the light pulses, without being actually positioned along the gaze direction of the user's eye. Therefore, an optical axis of the at least one camera need not necessarily lie along an optical axis of the user's eye for accurate detection of the gaze direction.

In an embodiment, the single chip is polygonal in shape. In another embodiment, the single chip is elliptical in shape. In another embodiment, the single chip is circular in shape. In yet another embodiment, the single chip is freeform in shape.

In an example, the plurality of optical filters may be implemented on a single rectangular chip, wherein the spatial arrangement of the optical filters of the first group and of the second group could be adjusted into separate regions of the chip. In such an example, the shapes of the regions could be defined such that the region comprising the optical filters of the first group is substantially circular in shape whereas the region comprising the optical filters of the second group is substantially elliptical in shape. Such shapes of the regions could be based upon the general eye geometry and the gaze direction of the user's eye, wherein the pupil of the user's eye appears substantially circular in shape and the sclera of the user's eye appears substantially elliptical in shape.

In another example, the spatial arrangement of the optical filters implemented on the single chip may vary in two dimensions. In other words, the regions of the single chip corresponding to the optical filters of the first group and of the second group may vary spatially across a two-dimensional plane of the single chip. In an example implementation, a square-shaped single chip may have 16 separate regions thereon, in the form of a 4*4 grid. In such an example, the optical filters of the first group and the optical filters of the second group occur at every other position (namely, at every alternate position, as an interlaid array pattern) along both orthogonal axes of the single chip. Therefore, every row and column of the single chip includes two regions corresponding to the optical filters of the first group arranged in an alternating manner with two regions corresponding to the optical filters of the second group.

In yet another example, the spatial arrangement of the optical filters implemented on the single chip may vary in one dimension. In other words, the regions of the single chip corresponding to the optical filters of the first group and of the second group may vary spatially along a single dimension across the two-dimensional plane of the single chip. It will be appreciated that such a spatial arrangement of the optical filters can be beneficially utilized when the side imaging arrangement is employed in the gaze-tracking system, for performing the requisite perspective correction. In an example implementation, a rectangular-shaped single chip may have 5 separate, but contiguous regions R1, R2, R3, R4 and R5 thereon, along a length of the single chip. In such an example, the optical filters of the first group are implemented by 3 contiguous regions (such as the regions R1, R2 and R3) and the optical filters of the second group are implemented by the remaining 2 contiguous regions (such as the regions R4 and R5) along the length of the single chip.

Furthermore, optionally, the grouping of the optical filters is reconfigurable. In such an instance, a number of groups of the optical filters and/or shapes and/or sizes of the regions thereof could be adjusted, as per requirement. Optionally, the processor is configured to programmatically reconfigure the grouping of the optical filters based upon at least one of: movement of the user's eye, change in the eye geometry, input from the user.

Optionally, the at least one camera is implemented by way of a hyperspectral camera. The hyperspectral camera is a spectral imaging equipment that allows for capturing reflected light pulses of contiguous spectral bands for each pixel in the captured image. Therefore, in the captured image, such reflected light pulses can be characterized with high precision and detail.

Alternatively, optionally, the at least one camera is implemented by way of at least one of: a digital camera, an RGB-D camera, a Light Detection and Ranging (LiDAR) camera, a Time-of-Flight (ToF) camera, a Sound Navigation and Ranging (SONAR) camera, a laser rangefinder, a stereo camera, a plenoptic camera, an infrared camera, and an ultrasound imaging equipment.

As mentioned previously, the processor is configured to control operations of the plurality of illuminators and the at least one camera, and to process the captured image to detect a gaze direction of the user. The processor could be hardware, software, firmware or a combination of these, suitable for implementing the aforesaid functionality. Optionally, the processor processes the image by employing at least one image processing algorithm. The at least one image processing algorithm is employed to detect the pupil of the user's eye and the positions and/or arrangement of the reflections of the light pulses in the user's eye. Therefore, the at least one image processing algorithm is employed to analyze a relationship between the position of the pupil of the user's eye and the reflections of the light, to accurately detect the gaze direction of the user. Optionally, the processor employs information pertaining to an arrangement of the plurality of illuminators, for detecting the gaze direction of the user. In such an instance, positions of the plurality of illuminators with respect to the eye, and the positions of the reflections of the light pulses emitted therefrom, facilitate the detection of the gaze direction of the user.

For illustration purposes only, there will now be considered an example wherein the gaze-tracking system may comprise an illuminator I1 for emitting a first wavelength of light and an illuminator I2 for emitting a second wavelength of light. In such an example, the first wavelength of light may be 900 nanometer whereas the second wavelength of light may be 900 nanometer. In such an instance, an optical distance from the at least one camera to centre of the user's eye may be 50 millimeter. Furthermore, a first focal plane of the at least one lens (that may be integrated within the at least one camera) corresponding to the first wavelength may be at 80 millimeter from the at least one lens whereas a second focal plane of the at least one lens corresponding to the second wavelength may be at 52 millimeter from the at least one lens. Therefore, the light pulses emitted by the first illuminator I1 are incident upon a first portion of the user's eye that lies within a depth of field of the first focal plane, and light pulses emitted by the second illuminator I2 are incident upon a second portion of the user's eye that lies within a depth of field of the second focal plane. Furthermore, in such an example, the at least one camera may comprise 16 photo-sensitive elements and two optical filters F1 and F2, an optical filter being implemented per photo-sensitive element. In such an example, the 16 photo-sensitive elements could be arranged as a 4*4 grid. Therefore, in the at least one camera, the two optical filters F1 and F2 could be arranged in an interlaid array pattern wherein the optical filters F1 and F2 occur at every other position (namely, at every alternate position) along both orthogonal axis of the grid of 16 photo-sensitive elements. Therefore, due to lack of chromatic-aberration correction of the at least one lens, reflections of the first and the second wavelengths of light, at are incident at different portions of the user's eye, are focused on the image plane of the at least one camera, thereby, allowing for capture of an image IMG representative of positions of the reflections of the first and the second wavelengths of light on the image plane of the at least one camera. Consequently, such an image IMG may be processed by the processor to determine the gaze direction of the user.

The present disclosure also relates to the method as described above. Various embodiments and variants disclosed above apply mutatis mutandis to the method.

Optionally, the method further comprises arranging the first illuminator and the second illuminator in a manner that the light pulses emitted by the first illuminator are incident upon the first portion of the user's eye that lies within the depth of field of the first focal plane, and the light pulses emitted by the second illuminator are incident upon the second portion of the user's eye that lies within the depth of field of the second focal plane, the first portion of the user's eye being farther away from the at least one camera than the second portion of the user's eye. Optionally, in the method, the at least one camera comprises the plurality of photo-sensitive elements and the plurality of optical filters, an optical filter being implemented per photo-sensitive element. Optionally, in this regard, the method further comprises dividing the plurality of optical filters into at least the first group and the second group; configuring optical filters of the first group to substantially allow the first range of wavelengths to pass through; and configuring optical filters of the second group to substantially allow the second range of wavelengths to pass through. More optionally, in the method, the plurality of optical filters are implemented on the single chip, and the method further comprises adjusting the spatial arrangement of the optical filters of the first group and of the second group into separate regions of the single chip; and defining shapes and/or sizes of the regions based upon the eye geometry and the gaze direction of the user's eye. Optionally, in the method, the grouping of the optical filters is reconfigurable. Optionally, in the method, the plurality of illuminators further comprise the third illuminator, and the method further comprises emitting light pulses of the third wavelength, via the third illuminator, to illuminate the user's eye for enabling detection of the position of the pupil of the user's eye, the third wavelength being shorter than the first wavelength, but longer than the second wavelength.

DETAILED DESCRIPTION OF THE DRAWINGS

Referring to FIG. 1, illustrated is a block diagram of a gaze-tracking system 100 for use in a head-mounted display apparatus (not shown), in accordance with an embodiment of the present disclosure. The gaze-tracking system 100 comprises a plurality of illuminators 102 for emitting light pulses to illuminate a user's eye when the head-mounted display apparatus is worn by the user, at least one lens 104 positioned on an optical path of reflections of the light pulses from the user's eye, at least one camera 106 for capturing an image of the reflections of the light pulses, and a processor 108 coupled in communication with the plurality of illuminators 102 and the at least one camera 106, wherein the processor 108 is configured to control operations of the plurality of illuminators 102 and the at least one camera 106, and to process the captured image to detect a gaze direction of the user. As shown, the plurality of illuminators 102 comprises at least a first illuminator 102A and a second illuminator 102B, a first wavelength of light emitted by the first illuminator 102A being longer than a second wavelength of light emitted by the second illuminator 102B.

Figure 2:
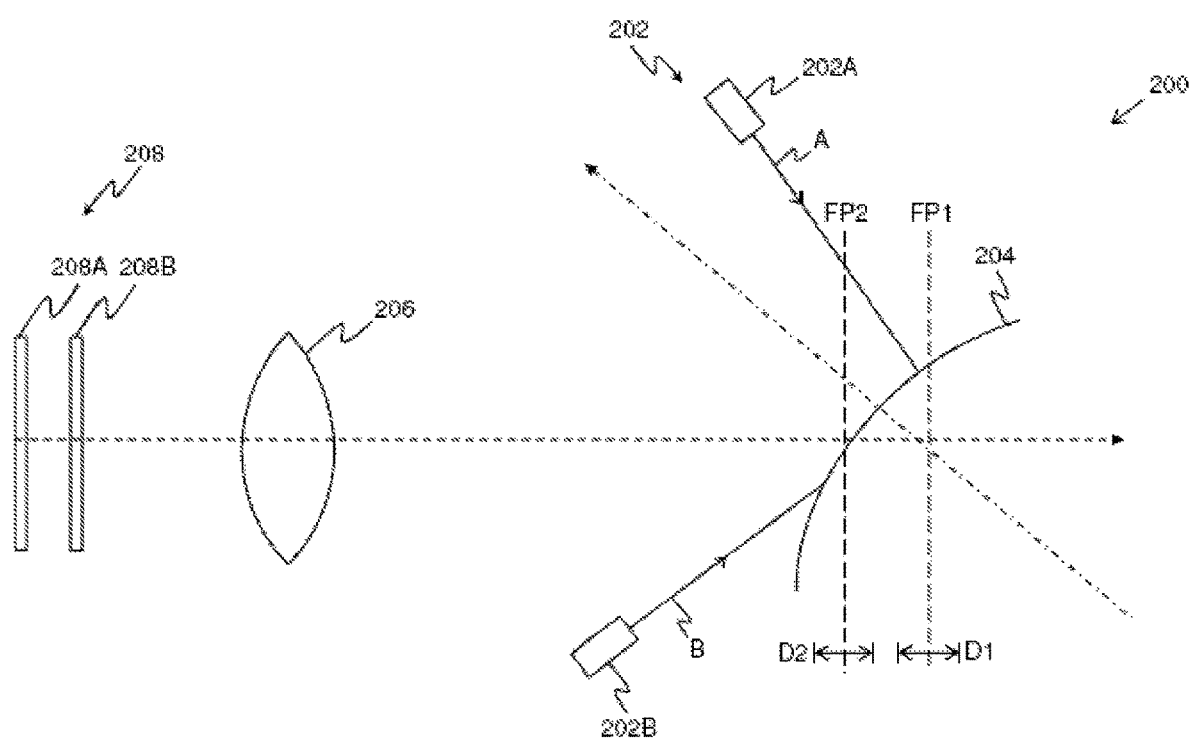
FIG. 2 illustrates an exemplary implementation of the gaze-tracking system, in accordance with an embodiment of the present disclosure.

Referring to FIG. 2, illustrated is an exemplary implementation of a gaze-tracking system 200, in accordance with an embodiment of the present disclosure. As shown, the gaze-tracking system 200 comprises a plurality of illuminators 202 for emitting light pulses to illuminate a user's eye 204 when a head-mounted display apparatus (not shown) is worn by a user. The plurality of illuminators 202 comprises at least a first illuminator 202A and a second illuminator 202B, a first wavelength of light emitted by the first illuminator 202A being longer than a second wavelength of light emitted by the second illuminator 202B. As shown, ray A depicts light emitted by the first illuminator 202A and ray B depicts light emitted by the second illuminator 202B. It will be appreciated that the dash-dot line represents an optical axis of the user's eye 204.

Furthermore, the gaze-tracking system 200 comprises at least one lens, depicted as lens 206, positioned on an optical path of reflections of the light pulses from the user's eye 204. The at least one lens 206 has no chromatic-aberration correction, whereby, a first focal plane FP1 of the at least one lens 206 corresponding to the first wavelength is farther away from the at least one lens 206 than a second focal plane FP2 of the at least one lens 206 corresponding to the second wavelength. The focal planes FP1 and FP2 are depicted by way of long-dashed lines. Moreover, the gaze-tracking system 200 comprises at least one camera, depicted as a camera 208 for capturing an image of reflections of the light pulses, wherein the image is representative of a position of the reflections on an image plane of the at least one camera 208. It will be appreciated that the short-dashed line represents an optical axis of the at least one camera 208.

As shown, in the gaze-tracking system 200, the first illuminator 202A and the second illuminator 202B are arranged in a manner that light pulses emitted by the first illuminator 202A are incident upon a first portion of the user's eye 204 that lies within a depth of field D1 of the first focal plane FP1, and light pulses emitted by the second illuminator 202B are incident upon a second portion of the user's eye 204 that lies within a depth of field D2 of the second focal plane FP2, the first portion of the user's eye 204 being farther away from the at least one camera 208 than the second portion of the user's eye 204. Therefore, reflections of the light emitted by both the first illuminator 202A and the second illuminator 202B are in focus (namely, appear acceptably sharp) at an image plane of the at least one camera 208 even though their optical distances from the at least one lens 206 are different.

Furthermore, in the gaze-tracking system 200, the at least one camera 208 comprises a plurality of photo-sensitive elements 208A and a plurality of optical filters 208B. Notably, the plurality of optical filters 208B are positioned on an optical path of the reflections of the light pulses, the plurality of optical filters 208B being configured to block unwanted parts of light spectrum from being incident upon the plurality of photo-sensitive elements 208A of the at least one camera 208.

It will be appreciated that the gaze-tracking system 200 is not limited to only two illuminators, and can have any number of illuminators, implemented as broadband infrared light sources, light emitting diodes, and the like. For example, the plurality of illuminators 202 may comprise a third illuminator, wherein a third wavelength of light emitted by the third illuminator may be shorter than the first wavelength, but longer than the second wavelength. In such a case, a third focal plane of the at least one lens 206 corresponding to the third wavelength may be positioned substantially between the focal planes FP1 and FP2.

Figures 3, 4A:
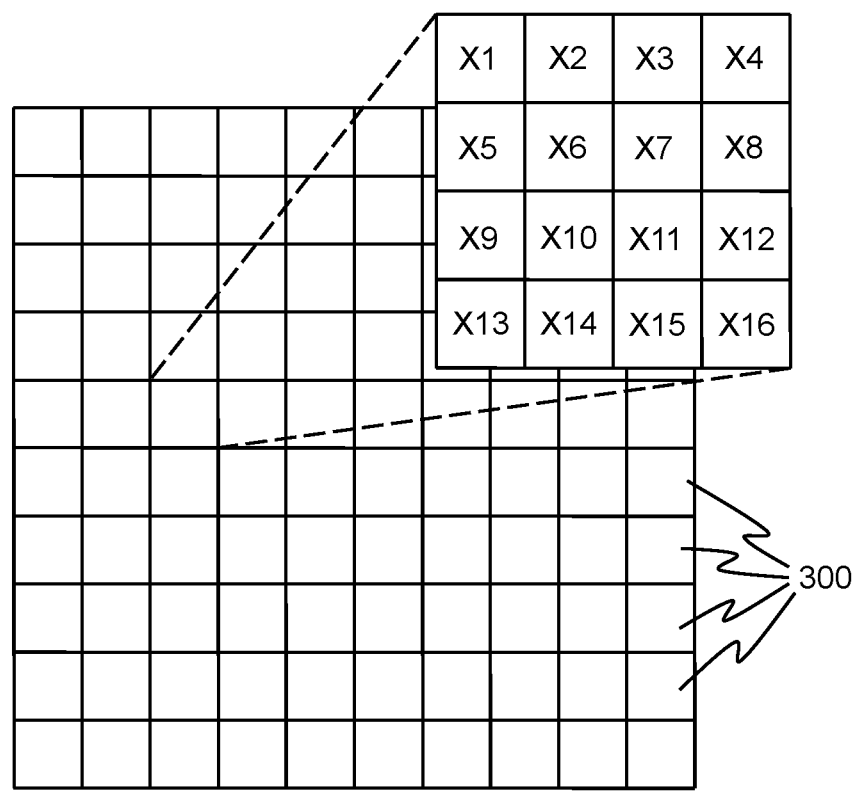
FIG. 3 illustrates a plurality of optical filters of a hyperspectral camera, in accordance with an embodiment of the present disclosure.
FIGS. 4A and 4B illustrate an implementation of a plurality of optical filters on a single chip, in accordance with an embodiment of the present disclosure.

Referring to FIG. 3, illustrated is a plurality of optical filters 300 of a hyperspectral camera (for example, such as the camera 208 of FIG. 2), in accordance with an embodiment of the present disclosure. Optionally, in the hyperspectral camera, the plurality of optical filters 300 are superposed on a plurality of photo-sensitive elements of the hyperspectral camera. In this regard, one optical filter could be superposed on one photo-sensitive element. Furthermore, optionally each of the plurality of optical filters 300 is configured to pass therethrough, only light within a specific wavelength range. Consequently, filtered light is incident upon the plurality of photo-sensitive elements. For example, each of the plurality of optical filters 300 may be configured to pass therethrough, only light having wavelength between 470 nanometre and 630 nanometre.

In FIG. 3, there is also shown an enlarged view of a single colour filter depicting that the single colour filter optionally comprises a plurality of bandpass filters X1-X16 arranged as a 4*4 mosaic. In such an instance, each of the bandpass filters X1-X16 could be configured to pass therethrough, only light within a unique wavelength range. For example, the bandpass filter X1 may pass therethrough, light within 470 nanometre and 480 nanometre; the bandpass filter X2 may pass therethrough, light within 480 nanometre and 490 nanometre; the bandpass filter X3 may pass therethrough, light within 490 nanometre and 500 nanometre, and so forth.

Figure 4B:
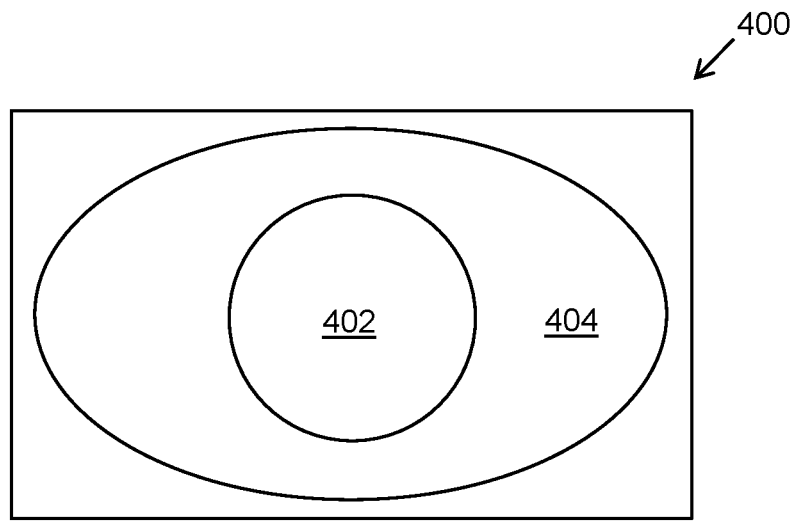

Referring to FIGS. 4A and 4B, illustrated is an implementation of a plurality of optical filters on a single chip 400, in accordance with an embodiment of the present disclosure. As shown in FIG. 4A, the plurality of optical filters are divided into at least a first group, depicted as optical filters labeled '1' and a second group, depicted as optical filters labeled '2'. The optical filters 1 of the first group are configured to substantially allow a first range of wavelengths to pass through, while the optical filters 2 of the second group are configured to substantially allow a second range of wavelengths to pass through. As an example, the optical filters 1 of the first group may be configured to substantially allow wavelengths between 600 nanometre and 800 nanometre to pass through whereas the optical filters 2 of the second group may be configured to substantially allow wavelengths between 800 nanometre and 1000 nanometre to pass through. Optionally, the grouping of the optical filters 1 and 2 is reconfigurable.

Furthermore, in FIG. 4B, there is shown a simplified spatial arrangement of the optical filters 1 and 2 of the first group and of the second group respectively, into separate regions of the single chip 400. Notably, the optical filters 1 of the first group are arranged in region 402 of the single chip 400 whereas the optical filters 2 of the second group are arranged in region 404 of the single chip 400. Furthermore, shapes and/or sizes of the regions 402 and 404 could be defined based upon an eye geometry and a gaze direction of a user's eye. As an example, the region 402 may be circular in shape whereas the region 404 may be elliptical in shape, based upon geometry of the pupil and the cornea of the user's eye.

Figures 5A, 5B:
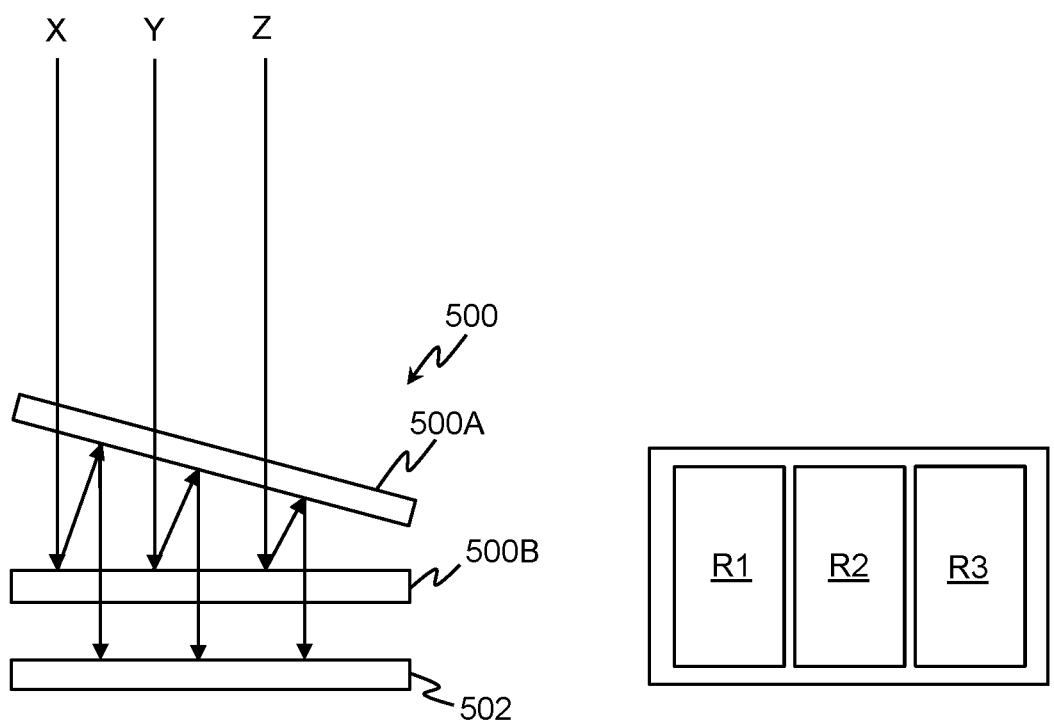
FIGS. 5A and 5B illustrate another implementation of a plurality of optical filters, in accordance with another embodiment of the present disclosure.

Referring to FIGS. 5A and 5B, illustrated is another implementation of a plurality of optical filters, in accordance with another embodiment of the present disclosure. As shown in FIG. 5A, the plurality of optical filters are implemented by way of a Fabry-Perot Interferometer 500 comprising optical elements 500A and 500B. Optionally, in the Fabry-Perot Interferometer 500, the plurality of optical filters are spatially implemented into separate regions (not shown). Furthermore, optionally, the optical elements 500A and 500B are highly reflective mirrors or highly reflective films. Furthermore, a plurality of photo-sensitive elements is implemented as an imaging sensor 502. In operation, reflections of light pulses X, Y and Z having different wavelengths is incident upon the Fabry-Perot Interferometer 500. Thereafter, filtered reflections of light pulses pass through the Fabry-Perot Interferometer 500 to be incident upon separate regions of the imaging sensor 502.

In FIG. 5B, there is shown a top view of the imaging sensor 502 depicting its separate regions R1, R2 and R3 whereupon the filtered reflections of light pulses are incident. As an example, the filtered reflections of the light pulse X are incident upon the region R1, the filtered reflections of the light pulse Y are incident upon the region R2 and the filtered reflections of the light pulse Z are incident upon the region R3. It will be appreciated that shapes and/or sizes of the separate regions R1, R2 and R3 of the imaging sensor 502 are substantially similar to shapes and/or sizes of the separate regions for implementing the plurality of optical filters in the Fabry-Perot Interferometer 500.

Optionally, the plurality of optical filters could be implemented by way of a Plasmonic filter.

Figure 6:
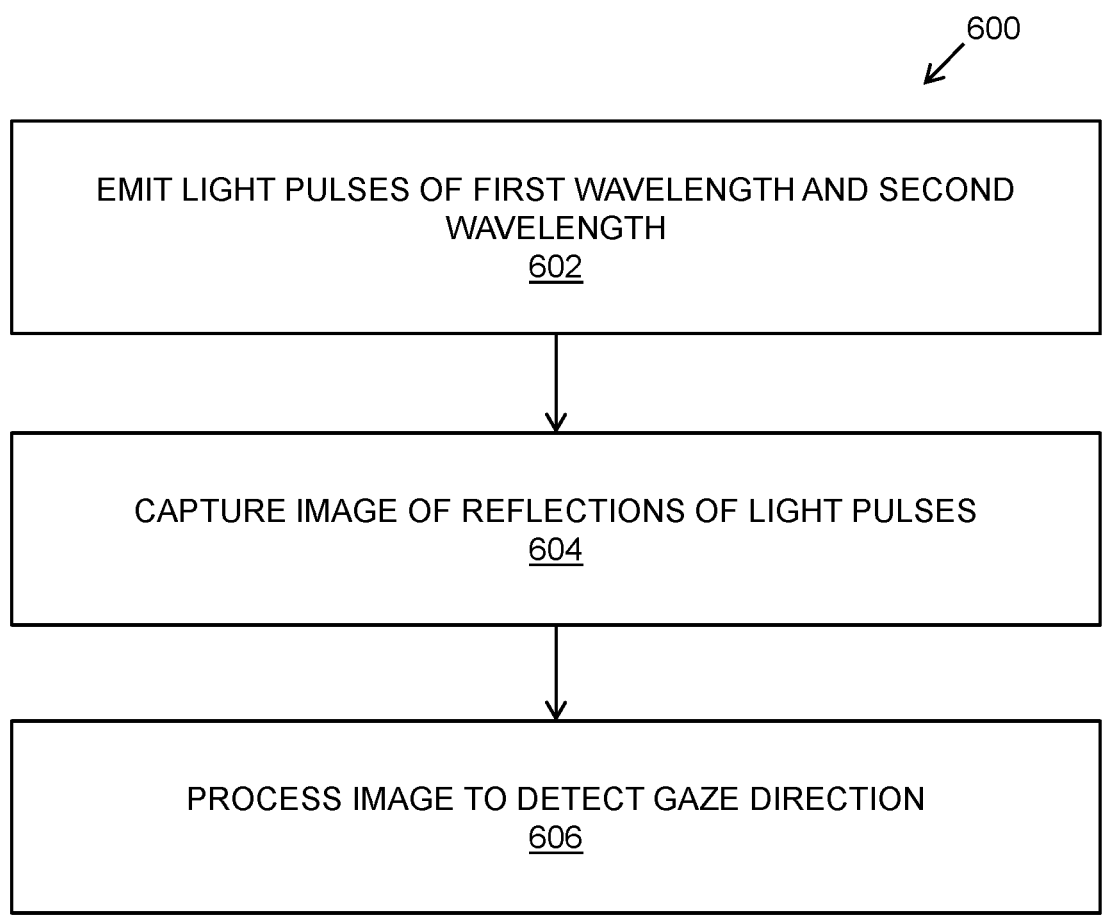
FIG. 6 illustrates steps of a method of tracking a user's gaze via a gaze-tracking system of a head-mounted display apparatus, in accordance with an embodiment of the present disclosure.

Referring to FIG. 6 illustrated are steps of a method 600 of tracking a user's gaze via a gaze-tracking system (for example, such as the gaze-tracking system 100 of FIG. 1) of a head-mounted display apparatus, in accordance with an embodiment of the present disclosure. At step 602, light pulses of a first wavelength and a second wavelength are emitted via the first illuminator and the second illuminator respectively, to illuminate a user's eye when the head-mounted display apparatus is worn by the user, the first wavelength being longer than the second wavelength. At least one lens is positioned on an optical path of reflections of the light pulses from the user's eye, wherein the at least one lens has no chromatic-aberration correction, whereby a first focal plane of the at least one lens corresponding to the first wavelength is farther away from the at least one lens than a second focal plane of the at least one lens corresponding to the second wavelength. At step 604, an image of the reflections of the light pulses is captured via at least one camera, the image being representative of a position of the reflections on an image plane of the at least one camera. At step 606, the captured image is processed to detect a gaze direction of the user.

The steps 602 to 606 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A gaze-tracking system for use in a head-mounted display apparatus, the gaze-tracking system comprising:
   a plurality of illuminators for emitting light pulses to illuminate a user's eye when the head-mounted display apparatus is worn by the user, the plurality of illuminators comprising at least a first illuminator and a second illuminator, a first wavelength of first light pulses emitted by the first illuminator being longer than a second wavelength of second light pulses emitted by the second illuminator;
   at least one lens positioned on an optical path of reflections of the first and second light pulses from the user's eye, wherein the at least one lens has no chromatic-aberration correction, and the at least one lens has a second local plane for the second wavelength and a first focal plane for the first wavelength that is farther away from the at least one lens than the second focal plane;
   at least one camera for capturing an image of the reflections of the first and second light pulses, wherein,
       the image is representative of a position of the reflections on an image plane of the at least one camera; and
       the image of the reflections of the first light pulses and the image of the reflections of the second light pulses are both in focus on the camera image plane due to the at least one lens having no chromatic-aberration correction; and
   a processor coupled in communication with the plurality of illuminators and the at least one camera, wherein the processor is configured to control operations of the plurality of illuminators and the at least one camera, and to process the captured image to detect a gaze direction of the user.

2. The gaze-tracking system of claim 1, wherein the first illuminator and the second illuminator are to be arranged in a manner that the first light pulses emitted by the first illuminator are incident upon a first portion of the user's eye that lies within a depth of field of the first focal plane, and the second light pulses emitted by the second illuminator are incident upon a second portion of the user's eye that lies within a depth of field of the second focal plane, the first portion of the user's eye being farther away from the at least one camera than the second portion of the user's eye.

3. The gaze-tracking system of claim 1, wherein the at least one camera comprises a plurality of photo-sensitive elements and a plurality of optical filters, an optical filter being implemented per photo-sensitive element.

4. The gaze-tracking system of claim 3, wherein the plurality of optical filters are divided into at least a first group and a second group, optical filters of the first group being configured to substantially allow a first range of wavelengths to pass through, while optical filters of the second group being configured to substantially allow a second range of wavelengths to pass through.

5. The gaze-tracking system of claim 4, wherein the plurality of optical filters are implemented on a single chip, and the processor is configured to adjust a spatial arrangement of the optical filters of the first group and of the second group into separate regions of the single chip, and to define shapes and/or sizes of the regions based upon an eye geometry and the gaze direction of the user's eye.

6. The gaze-tracking system of claim 4, wherein the grouping of the optical filters is reconfigurable.

7. The gaze-tracking system of claim 1, wherein the at least one camera is implemented by way of a hyperspectral camera.

8. The gaze-tracking system of claim 1, wherein the plurality of illuminators further comprise a third illuminator, a third wavelength of light emitted by the third illuminator being shorter than the first wavelength, but longer than the second wavelength, wherein the third illuminator is to be used to illuminate the user's eye for enabling detection of a position of a pupil of the user's eye.

9. The gaze-tracking system of claim 1, wherein an optical distance of the reflections of the first light pulses from the at least one lens is different from an optical distance of the reflections of the second light pulses from the at least one lens.

10. A method of tracking a user's gaze, via a gaze-tracking system of a head-mounted display apparatus, the gaze-tracking system comprising a plurality of illuminators comprising at least a first illuminator and a second illuminator, at least one lens and at least one camera, the method comprising:
   emitting first light pulses of a first wavelength and second light pulses of a second wavelength, via the first illuminator and the second illuminator respectively, to illuminate a user's eye when the head-mounted display apparatus is worn by the user, the first wavelength being longer than the second wavelength, the at least one lens being positioned on an optical path of reflections of the first and second light pulses from the user's eye, wherein the at least one lens has no chromatic-aberration correction, and the at least one lens has a second focal plane for the second wavelength and a first focal plane for the first wavelength that is farther away from the at least one lens than the second focal plane;
   capturing an image of the reflections of the first and second light pulses, via the at least one camera, the image being representative of a position of the reflections on an image plane of the at least one camera, wherein the image of the reflections of the first light pulses and the image of the reflections of the second light pulses are both in focus on the image plane due to the at least one lens having no chromatic-aberration correction; and
   processing the captured image to detect a gaze direction of the user.

11. The method of claim 10, further comprising arranging the first illuminator and the second illuminator in a manner that the first light pulses emitted by the first illuminator are incident upon a first portion of the user's eye that lies within a depth of field of the first focal plane, and the second light pulses emitted by the second illuminator are incident upon a second portion of the user's eye that lies within a depth of field of the second focal plane, the first portion of the user's eye being farther away from the at least one camera than the second portion of the user's eye.

12. The method of claim 10, wherein the at least one camera comprises a plurality of photo-sensitive elements and a plurality of optical filters, an optical filter being implemented per photo-sensitive element.

13. The method of claim 12, further comprising:
   dividing the plurality of optical filters into at least a first group and a second group;
   configuring optical filters of the first group to substantially allow a first range of wavelengths to pass through; and
   configuring optical filters of the second group to substantially allow a second range of wavelengths to pass through.

14. The method of claim 13, wherein the plurality of optical filters are implemented on a single chip, and the method further comprises:
   adjusting a spatial arrangement of the optical filters of the first group and of the second group into separate regions of the single chip; and
   defining shapes and/or sizes of the regions based upon an eye geometry and the gaze direction of the user's eye.

15. The method of claim 13, wherein the grouping of the optical filters is reconfigurable.

16. The method of claim 10, wherein the plurality of illuminators further comprise a third illuminator, and the method further comprises emitting light pulses of a third wavelength, via the third illuminator, to illuminate the user's eye for enabling detection of a position of a pupil of the user's eye, the third wavelength being shorter than the first wavelength, but longer than the second wavelength.

17. The method of claim 10, wherein an optical distance of the reflections of the first light pulses from the at least one lens is different than an optical distance of the reflections of the second light pulses from the at least one lens.

* * * * *